(12) United States Patent
Esplin et al.

(10) Patent No.: US 8,246,502 B2
(45) Date of Patent: Aug. 21, 2012

(54) CONTINUOUS VARIABLE TRANSMISSION ASSEMBLY

(76) Inventors: Antony Richard Esplin, New South Wales (AU); Raymond Noel Rogers, New South Wales (AU)

( * ) Notice: Subject to any disclaimer, the term of this patent is extended or adjusted under 35 U.S.C. 154(b) by 445 days.

(21) Appl. No.: 12/597,583

(22) PCT Filed: Apr. 24, 2008

(86) PCT No.: PCT/AU2008/000578
§ 371 (c)(1),
(2), (4) Date: Feb. 8, 2010

(87) PCT Pub. No.: WO2008/131483
PCT Pub. Date: Nov. 6, 2008

(65) Prior Publication Data
US 2010/0144477 A1     Jun. 10, 2010

(30) Foreign Application Priority Data
Apr. 26, 2007   (AU) .............................. 2007902199

(51) Int. Cl.
*F16H 47/04*   (2006.01)
*F16H 48/06*   (2006.01)
(52) U.S. Cl. ......................................... 475/83; 475/221
(58) Field of Classification Search .................... 475/31, 475/84, 89, 91, 83, 221
See application file for complete search history.

(56) References Cited

U.S. PATENT DOCUMENTS

| | | |
|---|---|---|
| 3,645,152 A | 2/1972 | Olcer |
| 4,974,471 A | 12/1990 | McGarraugh |
| 6,033,332 A | 3/2000 | Evans |
| 6,325,736 B1 * | 12/2001 | Hamada et al. ................ 475/18 |
| 6,447,419 B1 * | 9/2002 | Irikura et al. .................. 475/24 |
| 6,478,706 B1 * | 11/2002 | Crabb ............................. 475/18 |
| 6,634,976 B1 * | 10/2003 | Britt ............................... 475/91 |
| 7,993,230 B2 * | 8/2011 | Stettler et al. .................. 475/83 |

(Continued)

FOREIGN PATENT DOCUMENTS
EP    1055844    11/2000
(Continued)

OTHER PUBLICATIONS

Supplementary European Search Report, European Patent Office, Mar. 11, 2010.

(Continued)

*Primary Examiner* — Roger Pang
(74) *Attorney, Agent, or Firm* — Wood, Herron & Evans, LLP

(57) ABSTRACT

A variable ratio drive assembly (10) including: a planetary gear device (13) having an input shaft (15), an output shaft (17), with the shafts having a common rotational axis (21), an input gear (16) attached to the input shaft, an output gear (18) attached to the output shaft, a carriage (20) mounted for rotation about said axis, at least one planetary gear (19) meshed with the input gear and output gear, the planetary gear being rotatably mounted in the carriage, a ring gear (23) fixed to the carriage so as to be rotated about said axis, a pump gear (24) meshingly engaged with the ring gear, a pump device (51) drivingly connected to the pump gear and restriction means to control the flow so that said pump device (51) applies a torque to said pump gear to control rotation of said ring gear and therefore rotation of said output shaft.

4 Claims, 3 Drawing Sheets

U.S. PATENT DOCUMENTS

2001/0021680 A1* 9/2001 Okada .......................... 475/83
2007/0249454 A1 10/2007 Williames

FOREIGN PATENT DOCUMENTS

| | | |
|---|---|---|
| EP | 1170526 | 1/2002 |
| GB | 2382387 | 5/2003 |
| WO | 9961820 | 12/1999 |
| WO | 02057835 | 7/2002 |

OTHER PUBLICATIONS

International Search Report, Jul. 28, 2008.

* cited by examiner

CONTINUOUS VARIABLE TRANSMISSION ASSEMBLY

This application claims priority to PCT/AU2008/000578, filed on Apr. 24, 2008; which claims priority to Australia Patent Application No. AU 2007902199, filed on Apr. 26, 2007.

FIELD OF THE INVENTION

The present invention relates to a transmission assembly and, in particular to, a continuous variable hydromechanical transmission assembly for a vehicle.

BACKGROUND OF THE INVENTION

A continuously variable transmission for a vehicle is an alternative to a standard planetary automatic transmission which is common throughout the world. The job of a transmission, in a vehicle is to change the speed ratio between the engine and the wheels of a vehicle. The transmission uses a range of gears from low to high to make more effective use of an engine's torque as the driving conditions change. Those gears can be engaged manually or automatically. In a traditional automatic transmission, the gears are interlocking toothed wheels that transmit and modify rotary motion and torque. A combination of planetary gears create the different ratios.

A continuously variable transmission does not have a gear box with a set of gears or interlocking toothed wheels. Most common continuous variable transmissions include a belt and an input pulley and an output pulley. As the pulleys are at variable diameters, the belt changes location creating the gearing effect. The drive or input pulley is connected to the crank shaft of the engine and the driven or output pulley transfers the energy to the drive shaft. As the two pulleys change their radii relatively to one another they create an infinite number of gear ratios.

The advantages of a continuously variable transmission of a standard planetary automatic transmission are that the continuously variable transmission creates a smoother ride in a vehicle because it eliminates the jolting of changing gears, improves fuel efficiency, eliminates gear hunting as the car decelerates, provides better acceleration, provides better control over emissions, and replaces inefficient fluid torque converters.

In an attempt to utilise continuously variable transmissions more effectively, a number of different types have been developed. For example, the toroidal continuously variable transmission replaces the belts and pulleys with disks and power rollers. Hydrostatic continuously variable transmissions work by varying the radius of the contact point between two rotating objects. In this type of transmission the rotational motion of the engine operates a hydrostatic pump on the driving side. The pump converts rotational motion in fluid flow. Then with a hydrostatic motor located on the driven side the fluid is converted back into rotational motion. When a hydrostatic transmission is combined with a planetary gear set and clutches a hybrid known as a hydromechanical transmission is created. At a low speed, power is transmitted hydraulically, and at a high speed, power is transmitted mechanically. Between these extremes the transmission uses both hydraulic and mechanical means to transfer power.

It has however been found that existing hydromechanical transmissions have a limited number of gearing ratios, are not fully controlled, cannot provide a reverse function, and require hydraulic boosting to start.

OBJECT OF THE INVENTION

It is an object of the present invention to substantially overcome or at least ameliorate one or more of the disadvantages of the prior art, or to at least provide a useful alternative.

SUMMARY OF THE INVENTION

There is disclosed herein a variable ratio drive assembly including:

a first planetary gear device having an input shaft and an output shaft, with the shafts having a common rotational axis, an input gear attached to the input shaft so as to be drivingly associated therewith, an output gear attached to the output shaft so as to be drivingly associated herewith, a first carriage mounted for rotation about said axis, at least one planetary gear meshed with the input gear and output gear, the planetary gear being rotatably mounted in the carriage so as to be supported thereby and movable therewith, a ring gear fixed to the carriage so as to move therewith, and therefore rotated about said axis;

a pump gear meshingly engaged with the ring gear so as to be driven thereby;

a first pump device drivingly connected to the pump gear so as to be driven thereby to provide hydraulic fluid under pressure;

restriction means associated with the pump device and to receive said hydraulic fluid under pressure and operable to control the flow thereof so that said pump device applies a torque to said pump gear to thereby control rotation of said ring gear about said axis and therefore rotation of said output shaft;

a second planetary gear device, said second device having a second input shaft and a second output shaft, with the second shafts having a common rotational axis, a second input gear attached to the second input shaft so as to be drivingly associated therewith, a second output gear attached to the second output shaft so as to be drivingly associated therewith, a second carriage mounted for rotation about the common axis of the second shafts, at least one second planetary gear meshed with the second input gear and the second output gear, the second planetary gear being rotatably mounted in the second carriage so as to be supported thereby and movable therewith, a second ring gear fixed to the second carriage so as to move therewith and therefore rotated about the common axis of said second shafts;

a second pump gear meshingly engaged with the second ring gear so as to be driven thereby; and a second pump device drivingly connected to the second pump gear so as to be driven thereby to provide hydraulic fluid under pressure that is delivered to said restriction means, with the restriction means therefore being operable to control the flow from the second pump device so that the second pump device applies a torque to the second pump gear to thereby control rotation of the second ring gear about the common axis of said second shafts and therefore rotation of said second output shaft.

Preferably, said assembly includes a brake gear driven by said second output shaft, a brake pump driven by said brake gear so that the brake pump produces hydraulic fluid under pressure, and second restriction means operatively associated with the brake pump to receive hydraulic fluid under pressure therefrom, the second restriction means being operable to restrict the flow of hydraulic fluid produced by said brake pump to thereby selectively apply a braking torque to said second output shaft, with the first output shaft being drivingly connected to the second input shaft.

Preferably, each said pump device is a motor/pump device that upon receiving hydraulic fluid under pressure acts as a motor to drive a respective one of the ring gears.

Preferably, when the first input shaft is driven in a first angular direction, said first pump device when operated by said hydraulic fluid drives the first carriage in an angular direction opposite the direction of said first input shaft.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
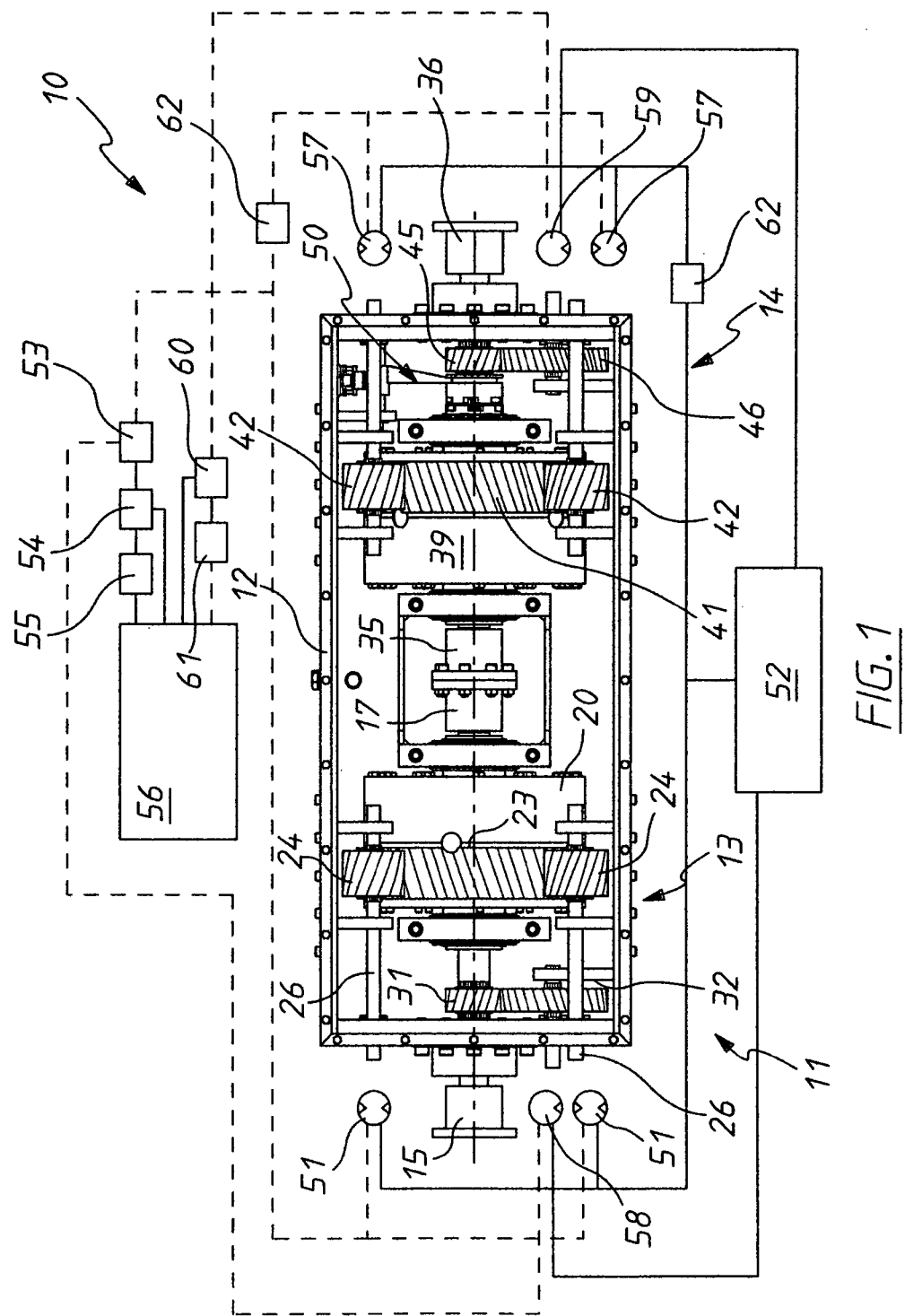
FIG. 1 is a schematic diagram of a variable ratio drive assembly.
Figure 2:
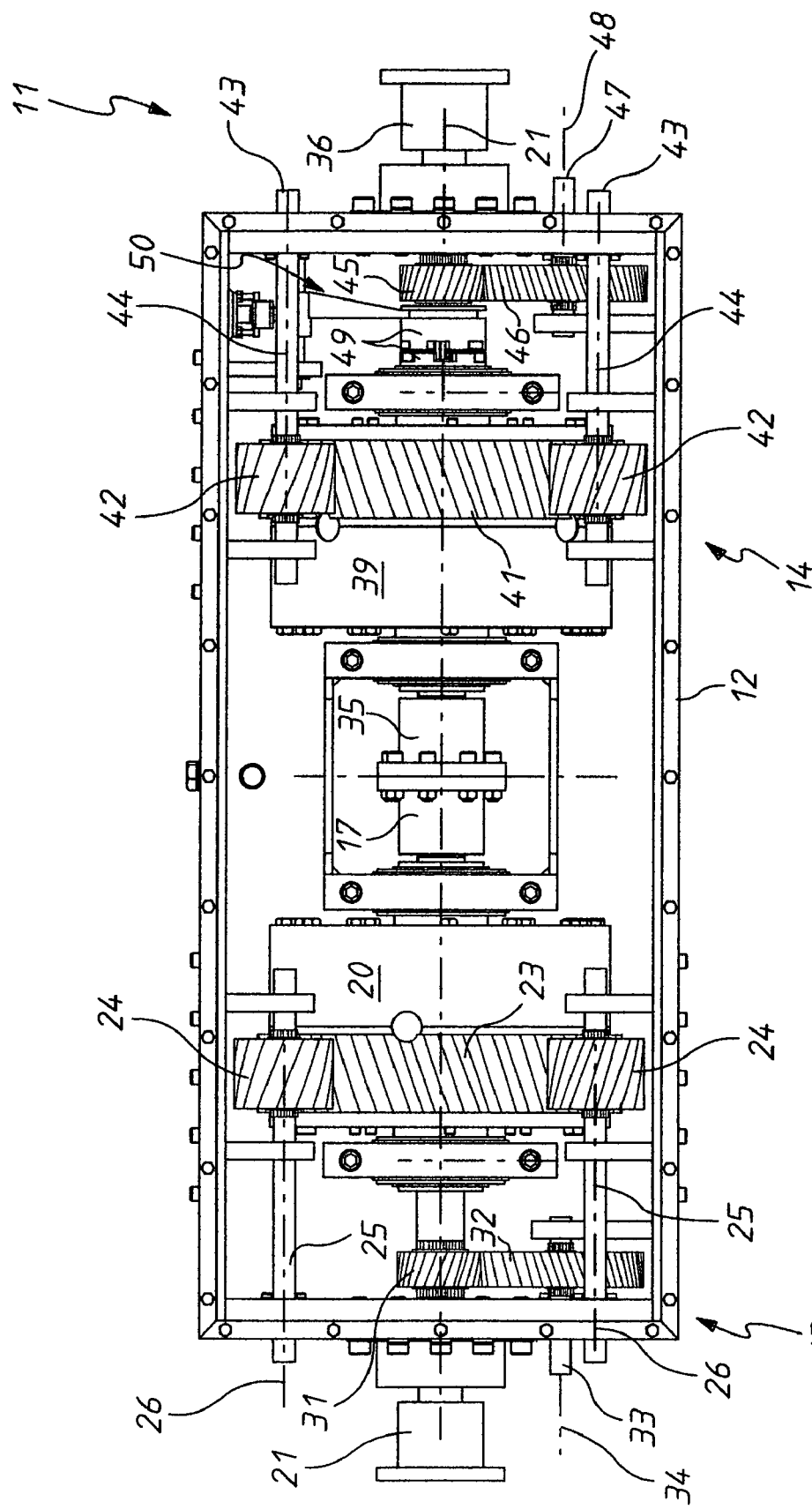
FIG. 2 is a schematic part sectioned top plan view of a gear assembly employed in the drive assembly of FIG. 1.
Figure 3:
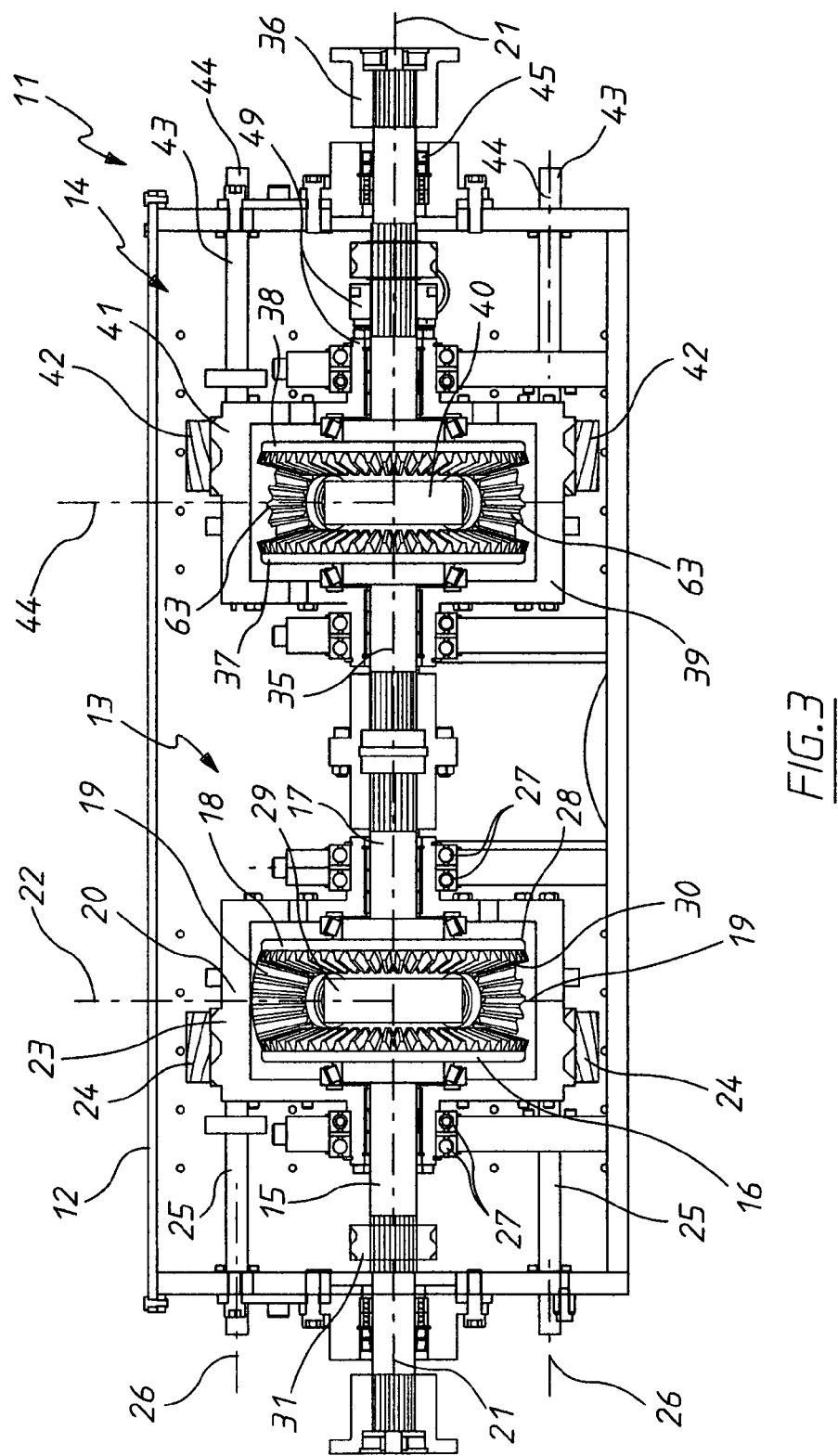
FIG. 3 is a schematic part sectioned side elevation of the gear assembly of FIG. 2 sectioned along the centre line thereof.

In the accompanying drawings there is schematically depicted a variable ratio drive assembly 10. The assembly 10 includes a gear assembly 11 more fully depicted in FIGS. 2 and 3. The gear assembly 11 includes a casing 12 within which there is located a pair of planetary gear devices 13 and 14.

The device 13 includes an input shaft 15 drivingly connected to an input gear 16, as well as an output shaft 17 connected to an output gear 18 so as to be driven thereby. Four planetary gears 19 are meshingly engaged with the gears 16 and 18 so as to transfer power therebetween. The planetary gears 19 are rotatably supported in a carriage 20. The carriage 20, together with the shafts 15 and 17 are rotatably supported by bearings supported by the casing 12. The shafts 15 and 17, gears 16 and 18 and casing 12 all rotate about a common longitudinal rotational axis 21. The planetary gears 19 each rotate about an axis 22 that is normal to and intersects with the axis 21.

Fixed to or formed integrally with the carriage 20 is a ring gear 23, so that upon rotation of the carriage 20 about the axis 21, the ring gear 23 is also rotated about the axis 21.

Meshingly engaged with the ring gear 23 are pump gears 24 each connected to a shaft 25 that extends beyond the casing 12. The pump gears 24 are spaced angularly about the axis 24, each having a rotational axis 26, each axis 26 being generally parallel to the axis 21.

The carriage 20 is supported in the casing 12 by means of bearings 27, while the carriage 20 itself is a closed housing providing a chamber 28 within which the gears 16, 18 and 19 are located.

In this embodiment there are four planetary gears 19 arranged at 90° displacements about the axis 21, each being supported by a shaft 29 extending between the carriage 20 and a central support member 30.

It should be appreciated the shafts 15 and 17 are rotatable about the axis 21, as well as being rotatable relative to the carriage 20, which in turn is rotatable about the axis 21 both relative to the casing 12 and the shafts 15 and 17.

Mounted on the shaft 15 by way of a spline is a motor gear 31 that is meshingly engaged with a further motor gear 32 connected to a shaft 33.

The gear 31 is rotated about the axis 21 with the shaft 15, while the gear 32, with its shaft 33, is rotatable about an axis 34 that is generally parallel to the axis 21.

The gear device 14 is very similar in construction to the gear device 13. In this embodiment the gear device 14 has an input shaft 35 and an output shaft 36, the shafts 35 and 36 being attached to gears 37 and 38. Meshingly engaged with the gears 37 and 38 are four planetary gears 63. The gears 63 are arranged at 90° intervals about the axis 21, with each being supported by a shaft (not illustrated) extending between a carriage 39 and support member 40. The carriage 39 has a ring gear 41 meshingly engaged with four pump gears 42, each pump gear 42 is attached to a respective shaft 43 extending outwardly of the easing 12. The shafts 17 and 35 are coupled so as to rotate in unison.

In the same manner as the device 13, the device 14 has the shafts 35 and 36 mounted for rotation about the axis 27, while the carriage 39 is rotatable about the axis 21 relative to the shafts 35 and 36. Each of the gears 63 is rotatable about an axis 44 that intersects with the axis 21 and is generally normal thereto.

The device 14 includes a brake gear 45 that is mounted on a spline formed on the shaft 36. The gear 45 is meshingly engaged with a further brake gear 46 that is attached to a shaft 47. The shaft 47 is rotatable about an axis 48 together with the gear 46.

Also mounted on the shaft 36 is a "dog" clutch 49 that is movable by means of an actuator assembly 50 into engagement with the carriage 39 so that the shaft 36 is selectively couplable to the carriage 39 so as to rotate therewith.

Each of the shafts 26 is drivingly connected to a motor/pump device 51 so that when driving the device 51 hydraulic fluid is taken from a tank outlet 52. The devices 51 provide hydraulic fluid under pressure delivered to a junction 53. The hydraulic fluid under pressure is delivered to a pressure relief valve 54 and a metering/stop valve 55, and then a tank inlet 56. The metering/stop valve 55 is operable to control the fluid flow rate of the hydraulic fluid passing therethrough and therefore the resistance provided by the devices 51 and 57.

Each of the shafts 43 is attached to a motor/pump device 57 also connected to the tank outlet 52 and the valves 53, 54 and 55 so as to deliver hydraulic fluid under pressure thereto when the device 57 is driven.

The shaft 33 is connected to a booster pump 58 that is operable to provide hydraulic fluid under pressure to the junction valve 53 from the tank outlet 52. This hydraulic fluid under pressure is delivered to the devices 51 and 57 to thereby drive the devices 51 and 57 when the devices 51 and 57 are to act as motors.

The shaft 47 is connected to a brake pump 59 that takes hydraulic fluid from the tank outlet 52 and delivers hydraulic fluid under pressure to a pressure relief valve 60 and a stop valve 61, connected to the tank return 56.

The motor/pump devices 57 deliver hydraulic fluid under pressure to the junction 53 via stop valves 62 when the devices 57 are driven by the gear 41.

As can be seen by the above, the devices 51 and 57 can operate as a pump or a motor. When operating as a pump, the devices 51 and 57 are driven by the respective shafts 25 and 43. When receiving hydraulic fluid under pressure from the pump 58, they act as motors and drive their associated shafts 25 and 43.

As one example, in operation of the above described assembly 10 the shafts 15 and 36 are interposed in the tail shaft (drive shaft) of a motor lorry to aid in maintaining the engine at a preferred RPM. The device 10 would also be operated to provide for a smooth transition in any change in RPM between the shafts 15 and 36.

When the shaft 15 is driven; the gear 16 is driven which would just merely rotate and not drive the shaft 17 unless there is some resistance provided by the gears 19. As the gears 19 rotate and they apply little resistance, the carriage 20 rotates about the axis 21 relative to the shafts 15 and 17. Rotation of the carriage 20 causes rotation of the gears 24 and therefore operation of the devices 51. The devices 51 cause a flow of hydraulic fluid delivered to the valve 55. Assuming the valve 55 is open then the devices 51 provide little resistance and therefore there is little (if any) rotation delivered to the shaft 17 since it will be the carriage 20 that rotates rather than the gear 18. However if the valve 55 is operated to provide a resistance (for example if it is closed or at least partly closed) the devices 51 provide a resistance in that they inhibit rotation of the gears 24. This in tutu inhibits rotation of the carriage 20 and therefore the gears 19 about the axis 21. This translates into rotation of the gear 18 and rotation of the shaft 17. As the shaft 17 is rotated so is the shaft 35. Operation of the device 14 is identical in that the devices 57 provide hydraulic fluid also delivered to the valve 55.

If a predetermined pressure is exceeded by the devices 51 and 57, the pressure relief valve 54 is operated to drain "excess pressure" to the tank inlet 56.

The rotational speed of the shaft 15 relative to the rotational speed of the shaft 36 can therefore be governed by operation of the valve 55. However this ratio can further be varied by operation of the pump 58. If hydraulic fluid under pressure is delivered to the devices 51 and 57 from the pump 58, the ring gear 23 is driven in the opposite direction to the shaft 15; thereby having the assembly 10 operate at a higher speed ratio.

For example if the pump 58 is driven by the ring gear 23, and then the devices 51 and 57 act as motors. This produces a relatively high speed ratio. However upon a heavy load being encountered the ring gear 23 will change in rotational direction so as to rotate in the same direction as the shaft 15 and therefore lower the gear ratio.

Normally the rotational direction of the shaft 15 is the same as the shaft 36. However upon the clutch 49 being operated to engage the carriage 39, the shaft 36 will so rotate in the opposite direction to the shaft 15 (a reverse direction) as the shaft 36 is fixed to the carriage 39.

The assembly 10 can also be operated in a braking mode by operation of the valve 61. If the valve 61 is closed, then the brake pump 59 provides a resistance to rotation of the shaft 36. If the pressure produced by the pump 59 is excessive, then "excess pressure" is vented to the tank inlets 56 via operation of the pressure relief valve 60.

The pumps 59 may also be rendered effectively inoperative by closing both of one of the valves 62. This disables the device 14. Accordingly the assembly 10 operates only with the device 13 operative. In this mode of operation, the assembly 10 would be driving the vehicle in a forward direction, as it would when both devices 13 and 14 are operative.

By operation of the valves 55 and 61, the assembly 10 can be operated so that the engine of the associated vehicle operates at a preferred RPM, as the gear ratio provided by the assembly 10 is continuously variable according to load.

The invention claimed is:

1. A variable ratio drive assembly including:
   a first planetary gear device having an input shaft and an output shaft, with the shafts having a common rotational axis, an input gear attached to the input shaft so as to be drivingly associated therewith, an output gear attached to the output shaft so as to be drivingly associated herewith, a first carriage mounted for rotation about said axis, at least one planetary gear meshed with the input gear and output gear, the planetary gear being rotatably mounted in the carrier so as to be supported thereby and movable therewith, a ring gear fixed to the carrier so as to move therewith and therefore rotated about said axis;
   a pump gear meshingly engaged with the ring gear so as to be driven thereby;
   a first pump device drivingly connected to the pump gear so as to be driven thereby to provide hydraulic fluid under pressure;
   restriction means associated with the pump device and to receive said hydraulic fluid under pressure and operable to control the flow thereof so that said pump device applies a torque to said pump gear to thereby control rotation of said ring gear about said axis and therefore rotation of said output shaft;
   a second planetary gear device, said second device having a second input shaft and a second output shaft, with the second shafts having a common rotational axis, a second input gear attached to the second input shaft so as to be drivingly associated therewith, a second output gear attached to the second output shaft so as to be drivingly associated therewith, a second carriage mounted for rotation about the common axis of the second shafts, at least one second planetary gear meshed with the second input gear and the second output gear, the second planetary gear being rotatably mounted in the second carrier so as to be supported thereby and movable therewith, a second ring gear fixed to the second carrier so as to move therewith and therefore rotated about the common axis of said second shafts;
   a second pump gear meshingly engaged with the second ring gear so as to be driven thereby; and
   a second pump device drivingly connected to the second pump gear so as to be driven thereby to provide hydraulic fluid under pressure that is delivered to said restriction means, with the restriction means therefore being operable to control the flow from the second pump device so that the second pump device applies a torque to the second pump gear to thereby control rotation of the second ring gear about the common axis of said second shafts and therefore rotation of said second output shaft.

2. The drive assembly of claim 1, wherein said assembly includes a brake gear driven by said second output shaft, a brake pump driven by said brake gear so that the brake pump produces hydraulic fluid under pressure, and second restriction means operatively associated with the brake pump to receive hydraulic fluid under pressure therefrom, the second restriction means being operable to restrict the flow of hydraulic fluid produced by said brake pump to thereby selectively apply a braking torque to said second output shaft, with the first output shaft being drivingly connected to the second input shaft.

3. The drive assembly of claim 1 wherein each said pump device is a motor/pump device that upon receiving hydraulic fluid under pressure acts as a motor to drive a respective one of the ring gears.

4. The drive assembly of claim 3, wherein when the first input shaft is driven in a first angular direction, said pump device when operated by said hydraulic fluid drives the first carriage in an angular direction opposite the direction of said first input shaft.

* * * * *